United States Patent [19]

Sugiyama et al.

[11] Patent Number: 4,587,558
[45] Date of Patent: May 6, 1986

[54] ADDRESS SIGNAL GENERATING CIRCUIT FOR A MEMORY CIRCUIT

[75] Inventors: Hiroyuki Sugiyama, Isehara; Nobuaki Takahashi, Yamato; Takeshi Shibamoto, Sagamihara; Hideo Sato, Yokohama; Yoshiaki Amano, Fujisawa; Koji Tanaka, Tokyo, all of Japan

[73] Assignee: Victor Company of Japan, Ltd., Japan

[21] Appl. No.: 540,553

[22] Filed: Oct. 11, 1983

[30] Foreign Application Priority Data

Oct. 15, 1982 [JP] Japan ................................ 57-181094

[51] Int. Cl.$^4$ .............................................. H04N 5/14
[52] U.S. Cl. .................................. 358/160; 358/21 R; 358/339; 364/518; 360/36.2
[58] Field of Search ............... 358/11, 21 R, 160, 339; 360/36.1, 36.2, 49; 364/518; 365/230, 237

[56] References Cited

U.S. PATENT DOCUMENTS 4,486,780 12/1984 Ive .......................................... 358/160

Primary Examiner—Tommy P. Chin
Assistant Examiner—Michael D. Parker
Attorney, Agent, or Firm—Andrus, Sceales, Starke & Sawall

[57] ABSTRACT

An address signal generating circuit for a memory circuit comprises a first latch driver for producing a signal corresponding to upper m bits of a 2m-bit address signal which is to be generated, where m is an integer, a second latch driver for producing a signal corresponding to lower m bits of the 2m-bit address signal, a circuit for dividing a 2m-bit signal which has a predetermined value into upper m bits and lower m bits and for alternately producing signals corresponding to the upper and lower m bits, a first adder for adding the value of n bits in the signal which has the predetermined value and the value of upper n bits in an output signal of the first or second latch driver and for producing an n-bit signal, where n is an integer less than m, a second adder for adding the value of m-n bits in the signal which has the predetermined value and lower m-n bits of the output signal of the first or second latch driver and for producing an (m-n)-bit signal, an adding circuit for supplying a carry signal of the first or second adder to the second or the first adder so as to add the carry signal with another input signal of the second or the first adder, and a driver control circuit for controlling the first and second latch drivers to alternately and time-divisionally produce upper m bits of the 2m-bit address signal and lower m bits of the 2m-bit address signal by alternately latching an m-bit output signal of the first and second adders in the first and second latch drivers.

5 Claims, 7 Drawing Figures

ADDRESS SIGNAL GENERATING CIRCUIT FOR A MEMORY CIRCUIT

BACKGROUND OF THE INVENTION

The present invention generally relates to address signal generating circuits for memory circuits, and more particularly to an address signal generating circuit which generates an address signal indicating a value which varies by a predetermined value, and supplies the generated address signal to a memory circuit.

When writing data into a predetermined address in a memory circuit and reading out data from a predetermined address in the memory circuit, it is necessary to use an address signal which specifies the predetermined address, as is well known. The value of such an address signal normally varies by one. However, depending on the kind of data which is to be written into or read out from the memory circuit, it becomes necessary to vary the value of the address signal by a predetermined value.

There is a reproducing apparatus which reproduces recorded signals from a recording medium which is recorded with a component coded signal. The component coded signal is a signal in which picture element data of a digital luminance signal and picture element data of two kinds of digital color difference signals, are time-sequentially multiplexed. The digital luminance signal is obtained by subjecting a luminance signal which is related to a still picture, to a digital pulse modulation. The two kinds of digital color difference signals are obtained by subjecting two kinds of color difference signals which are related to the still picture, to a digital pulse modulation. The above described reproducing apparatus is provided with a memory circuit. The component coded signal which corresponds to one frame (or one field), for example, is written into the memory circuit, and the signals making up the component coded signal which is written in the memory circuit, are read out simultaneously in parallel. These signals making up the component coded signal are repeatedly read out in a predetermined sequence. Because a display device for monitoring the signal which is read out from the memory circuit generally scans horizontally from the left to right of the picture and scans vertically from top to bottom of the picture at a predetermined speed, the picture element data which make up the component coded signal which is written in memory circuit are read out from the memory circuit in agreement with this scanning sequence.

However, when converting the number of scanning lines so as to convert the picture element data of a system which employs 625 scanning lines into the picture element data of a system which employs 525 scanning lines, the picture element data in one scanning line of the 525-line system are formed from the picture element data of the 625-line system in two mutually adjacent scanning lines, namely, one scanning line in the picture related to the first field (odd field) and one scanning line in the picture related to the second field (even field). Hence, in order to facilitate such a conversion, it is preferred that the picture element data of the component coded signal are transmitted from top to bottom of the picture (that is, the picture element data of the first field and the picture element data of the second field are alternately transmitted) and from the left to right of the picture.

The component coded signal which is recorded on the recording medium, may be made up of a picture element data group comprising picture element data which are arranged in a sequence from the picture element data which are displayed at the uppermost part of the picture to the picture element data which are displayed at the lowermost part of the picture, and from the picture element data which are displayed at the leftmost part of the picture to the picture element data which are displayed at the rightmost part of the picture, for example. In this case, the picture element data which are arranged in a sequence different from the read-out sequence, are successively supplied to the memory circuit in the reproducing apparatus. Accordingly, in this case, the value of the write-in address in the memory and the value of the read-out address in the memory, vary with different values. For example, if it is assumed that the picture element data which are to be displayed at locations in agreement with the scanning sequence of the display device described before, are successively read out by incrementing the read-out address in the memory circuit by one from "0", the write-in address must be varied by a value which is the total number of picture element data displayed in one scanning line or an integer division of this total number. That is, if 114 picture element data are displayed in one scanning line, the picture element data which is located at the uppermost and leftmost part of the picture and is first supplied to the memory circuit, is written into the address "0". The picture element data which is located in the second scanning line from the uppermost (the first scanning line of the second field) and leftmost part of the picture and is subsequently supplied to the memory circuit, is written into the address "114". The picture element data which is located in the third scanning line from the uppermost (the second scanning line of the first field) and leftmost part of the picture and is subsequently supplied to the memory circuit, is written into the address "228". The write-in address is thereafter incremented by 114 in this manner. When all of the picture element data located at the leftmost part of the picture have been written into the memory circuit, the picture element data located at the uppermost part which is second from the leftmost part of the picture, is supplied to the memory circuit, and the picture element data from the uppermost to the lowermost part of the picture are thereafter similarly supplied to the memory circuit. Thus, the write-in address is successively incremented by 114 from the address "1".

In the above case, the read-out address must be incremented by one from "0" if the write-in address is incremented by one from "0". When the sequence with which the data are supplied to the memory circuit differs from the read-out sequence, it is necessary to vary the write-in address or the read-out address by a predetermined value.

SUMMARY OF THE INVENTION

Accordingly, it is a general object of the present invention to provide a novel and useful address signal generating circuit for a memory circuit, which has satisfied the above described demands.

Another and more specific object of the present invention is to provide an address signal generating circuit for a memory circuit, which divides all of the bits in the address signal into upper bits and lower bits so as to divide the address signal into a signal corresponding to the upper bits and a signal corresponding to the lower bits, and time-sequentially produces the signals corresponding to the upper and lower bits. According to the address signal generating circuit of the present invention, the number of output terminals may be made less than the total number of bits in the address signal. Therefore, the circuit construction of the address signal generating circuit according to the present invention is simple compared to the circuit construction of an address signal generating circuit which simultaneously produces all of the bits in the address signal.

Still another object of the present invention is to provide an address signal generating circuit for a memory circuit, which comprises a first latch driver for producing a signal corresponding to upper m (m is an integer) bits among a total of 2m bits in the address signal which is to be produced, a second latch driver for producing a signal corresponding to lower m bits in the address signal, circuits for dividing a signal which has a predetermined value into signals having values which correspond to upper m bits and lower m bits of the predetermined value and for alternately producing these signals, a first adder for adding at least the value of n (n is an integer and n<m) bits in the signal which has the predetermined value and the value of upper n bits in the output signal of the first or second latch driver and for producing an n-bit signal which corresponds to upper n bits in the first and second latch drivers, a second adder for adding at least the value of m−n bits in the signal which has the predetermined value and lower m−n bits of the output signal of the first or second latch driver and for producing a (m−n)-bit signal which corresponds to lower (m−n) bits in the first and second latch drivers, and means for supplying a carry signal of the first adder to the second adder so as to add the carry signal with another input signal of the second adder, and for supplying a carry signal of the second adder to the first adder so as to add the carry signal with another input signal of the first adder, and driver control means for alternately operating the first and second latch drivers so that the first and second latch drivers time-divisionally produce the signal corresponding to the upper bits in the address signal and the signal corresponding to the lower bits in the address signal.

According to the present invention, it is possible to generate an address signal indicating a value which varies by a predetermined value, by an address signal generating circuit which has a simple circuit construction. Further, the address signal generating circuit according to the present invention is especially effective when applied to a memory circuit which writes picture element data which are transmitted in a vertical sequence from the left to right (or right to left) of the picture, and successively reads out the written picture element data in a sequence from the top to bottom and from the left to right of the picture where the picture elements are to be displayed.

Other objects and further features of the present invention will be apparent from the following detailed description when read in conjunction with the accompanying drawings.

DETAILED DESCRIPTION

First, before describing the address signal generating circuit according to the present invention, description will be given with respect to a previously proposed digital video signal recording system and reproducing apparatus which may be applied with the address signal generating circuit according to the present invention. This previously proposed recording system and reproducing apparatus was disclosed in a U.S. patent application Ser. No. 485,054 filed Apr. 14, 1983, now U.S. Pat. No. 4,520,401, which is assigned to the same assignee as the assignee of the present application. According to this recording system, a digital video signal in which a product of the number of luminance picture elements in one scanning line and the number of effective scanning lines in one picture of a standard television system is selected to a value exceedingly close to $2^{18}$ but not exceeding $2^{18}$, is time-sequentially multiplexed with a digital audio signal and recorded onto a recording medium. Thus, a memory circuit in the reproducing apparatus which reproduces the recorded signals from this recording medium, which stores the reproduced digital video signal, may be made up from generally marketed memory elements. Moreover, one address signal generating circuit may be used in common for each of the memory elements in the memory circuit.

Figure 1:
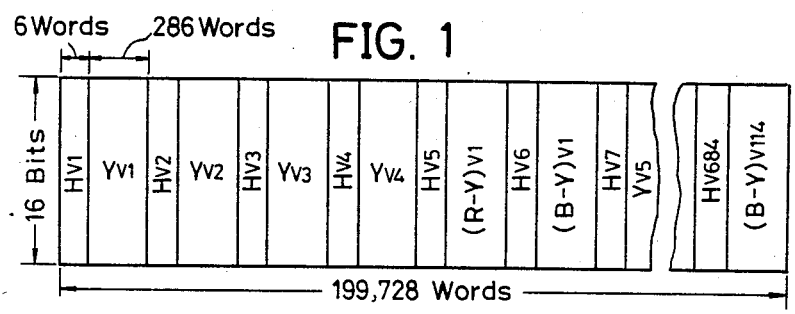
FIG. 1 shows an example of a signal format of a digital video signal which is supplied to a memory circuit.

It will be assumed that the digital video signal which is recorded on a digital audio disc together with the digital audio signal, is recorded with a signal format shown in FIG. 1, for example. FIG. 1 shows the signal format of the digital video signal which corresponds to one frame. The digital video signal corresponding to one frame is made up of 684 header signals $H_{V1}$ through $H_{V684}$, and component coded signals $Y_{V1}$, $Y_{V2}$, $Y_{V3}$, $Y_{V4}$, $(R-Y)_{V1}$, $(B-Y)_{V1}$, ..., and $(B-Y)_{V114}$ which relate to a color still picture, for example.

Description will first be given with respect to the component coded signal. Among the color video signal having 625 scanning lines, a horizontal scanning frequency of 15.625 kHz, and corresponds to one frame, only the signal within the video period is divided into the luminance signal and the color difference signals (R−Y) and (B−Y) and transmitted. The luminance signal is sampled at a sampling frequency of 9 MHz and quantized with a quantization number of 8 bits. On the other hand, the two kinds of color difference signals (R−Y) and (B−Y) are each sampled at a sampling frequency of 2.25 MHz and quantized with a quantization number of 8 bits. As disclosed in the U.S. patent application Ser. No. 485,054, the number of sampling points (picture elements) of the luminance signal in one scanning line is set to 456, so that the product of the number of picture elements and the number of effective scanning lines assumes a value which is exceedingly close to $2^{18}$ but less than $2^{18}$. In addition, the number of effective scanning lines is set to 572 for one frame. Accordingly, the numbers of picture elements of the two kinds of digital color difference signals (R−Y) and (B−Y) in one scanning line, each become equal to 114.

By use of a memory circuit, the digital luminance signal becomes a signal having a sampling frequency of 88.2 kHz and a quantization number of 8 bits, and the two kinds of digital color difference signals each become a signal having a sampling frequency of 88.2 kHz and a quantization number of 8 bits. The header signal is a digital signal having a sampling frequency of 44.1 kHz and a quantization number of 16 bits. Hence, if one word is made up of 16 bits, two picture element data can be transmitted in one word.

In FIG. 1, the digital video signal corresponding to one frame comprises a total of 199,728 words. The picture element data groups $Y_{V1}$ through $Y_{V456}$ of the digital luminance signal each made up of 286 words, the picture element data groups (R−Y)$_{V1}$ through (R−Y)$_{V114}$ and (B−Y)$_{V1}$ through (B−Y)$_{V114}$ of the digital color difference signals each made up of 286 words, and a total of 684 header signals $H_{V1}$ through $H_{V684}$ each made up of 6 words and multiplexed to the beginning of each of the picture element data groups, are time-sequentially multiplexed in this digital video signal corresponding to one frame.

Figure 2:
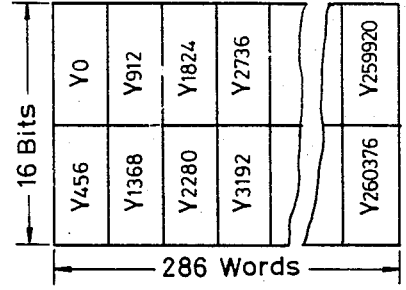
FIG. 2 shows an example of a signal format of a picture element group within the signal format shown in FIG. 1.

A total of 572 luminance picture element data groups in the first vertical column at the leftmost part of the screen are indicated by $Y_{V1}$, and each of the picture element data are arranged in sequence from the top of the screen to the bottom of the screen. As shown in FIG. 2, the picture element data $Y_0$ at the uppermost part of the screen is arranged in the upper 8 bits of the first word, and the picture element data $Y_{456}$ at the second uppermost part of the screen is arranged in the lower 8 bits of the first word. Similarly, the picture element data $Y_{912}$ is arranged in the upper 8 bits of the second word, the picture element data $Y_{1368}$ is arranged in the lower 8 bits of the second word, the picture element data $Y_{1824}$ is arranged in the upper 8 bits of the third word, ..., and the picture element data $Y_{260376}$ at the lowermost part of the screen is arranged in the lower 8 bits of the 286-th word. A total of 572 luminance picture element data groups in the second column from the left end of the screen are indicated by $Y_{V2}$, and a total of 572 luminance picture element data groups in the third column from the left end of the screen are indicated by $Y_{V3}$. Similarly, a total of 572 luminance picture element data groups in the i-th (i is an integer from 1 to 456) column from the left end of the screen are indicated by $Y_{Vi}$. Each of the picture element data are arranged similarly as the above picture element data group $Y_{V1}$, and the picture element data corresponding to one vertical column are transmitted by 286 words.

In addition, a total of 572 picture element data groups of the first digital color difference signal arranged in the j-th (j is an integer from 1 to 114) column from the left end of the screen are indicated by (R−Y)$_{Vj}$, and a total of 572 picture element data groups of the second digital color difference signal arranged in the j-th column from the left end of the screen are indicated by (B−Y)$_{Vj}$. Each of the 572 picture element data groups corresponding to one column are arranged in a sequence starting from the top to the bottom of the screen in the upper 8 bits of the first word, lower 8 bits of the first word, upper 8 bits of the second word, lower 8 bits of the second word, upper 8 bits of the third word, ..., and lower 8 bits of the 286-th word, and the picture element data corresponding to one column are transmitted by 286 words. A header signal having six bits, for example, is added to the beginning of each of the above divided picture element data groups.

Further, as shown in FIG. 1, the above component coded signal has a signal format in which the signal is time-sequentially transmitted in terms of units, where one unit comprises a total of six picture element data groups, that is, four picture element groups $Y_{V(4j−3)}$, $Y_{V(4j−2)}$, $Y_{V(4j−1)}$, and $YV(4j)$ and the two kinds of digital color difference signals (R−Y)$_{Vj}$ and (B−Y)$_{Vj}$.

Figure 3:
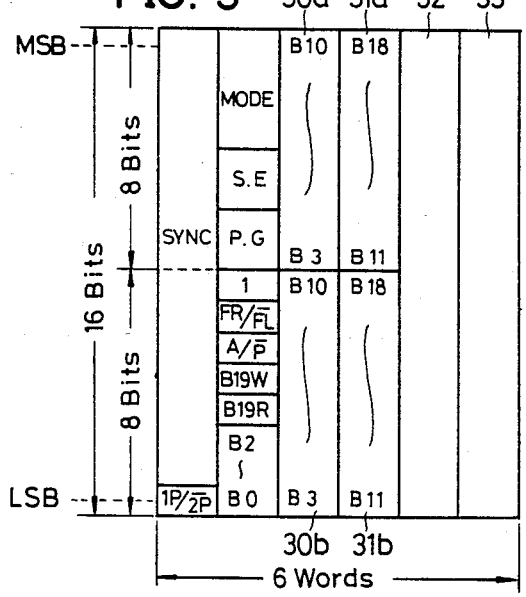
FIG. 3 shows an example of a signal format of a header signal within the signal format shown in FIG. 1.

Next, description will be given with respect to the signal format of the header signals $H_{V1}$ through $H_{V684}$, by referring to FIG. 3. The header signals $H_{V1}$ through $H_{V684}$ are each made up of six words. In FIG. 3, the arrangement of the bits is shown in the vertical direction, where the uppermost bit represents the most significant bit (MSB) and the lowermost bit represents the least significant bits (LSB). The words are shown in the horizontal direction. The first word of the header signal comprises a synchronizing signal which consists of upper fifteen bits which are all "1", and a 1-bit transmission channel identification code represented by "1P/2P" which is located at the LSB. The transmission channel identification code identifies the channels which are used to transmit the digital video signal, among the four transmission channels. When this transmission identification code is "1P", that is, when "1", it is identified that the digital video signal is transmitted in the fourth channel. On the other hand, when the transmission channel identification code is "2P", that is, when "0", it is identified that two channels, namely, the third and fourth channels, are used to transmit the digital video signal. In the present embodiment, it will be assumed that the transmission channel identification code is "2P", that is, "0". When the transmission channel identification code is "2P", the kind of picture to which the digital video signal relates, may be made mutually different in the third and fourth channels. The kind of picture may be pictures such as a scenery, portrait, and a scene showing a musician play. By making the kinds of pictures which are transmitted in the third and fourth channels different from each other, it becomes possible for the viewer to select his preference. However, in the present embodiment, the third and fourth channels each transmit one word of the same picture. That is, the sampling frequency is equivalently doubled by this transmission method.

Various identification codes are transmitted in the second word of the header signal. A 4-bit picture mode identification code represented by "MODE", is located in the upper four bits in the second word of the header signal. This picture mode identification code identifies whether the digital video signal which is to be recorded relates to a regular still picture (the description given before in conjunction with FIG. 1 was an example of the case where the digital video signal which is to be recorded relates to this regular still picture), a moving picture using a run-length code, a high definition still picture with 1125 scanning lines, or the like. A 2-bit special effect identification code represented by "S.E." is located in the subsequent fifth and sixth bits among the upper 8 bits in the second word of the header signal.

This special effect identification code identifies special effects such as fade-in, and changing of the picture from the top or left of the picture, with respect to the still picture. A 2-bit picture category identification code represented by "P.G.", is located in the subsequent seventh and eighth bits among the upper 8 bits. When the third and fourth channels are used to transmit independent digital video signals, a normal picture is transmitted in the fourth channel, for example. Then, a special picture in which various kinds of digital video signals are time-sequentially multiplexed, is transmitted in the third channel. In such a case, the picture category identification code indicates the value of a category number which is assigned to each of the various categories of pictures (the maximum number of categories is four in the present embodiment) transmitted in the third channel. Each of the pictures transmitted in the third channel must have continuity when displayed, and are pictures (musical scores, scenery, illustrations, scene showing a musician play, and the like, for example) which should not be changed to another picture before their display is completed. The picture category identification code identifies the category number which is assigned according to the category of the picture. Accordingly, when the viewer selects to reproduce the picture of the third channel and specifies a desired category number, only the picture corresponding to the specified category number is continuously reproduced, and the picture corresponding to that specified category number is prevented from being interrupted by pictures corresponding to other category numbers.

The ninth bit, that is, the first bit among the lower eight bits, of the second word which is represented by "1", indicates a binary "1". This ninth bit is provided so as to prevent all the 16 bits in the second word from becoming "0" when the values of the various codes all become "0". A 1-bit picture information quantity identification code represented by "FR/$\overline{FL}$", is located at the tenth bit of the second word of the header signal. This picture information identification code identifies whether the digital video signal which is to be transmitted corresponds to one frame or one field. It is identified that the digital video signal corresponds to one frame when this picture information quantity identification code is "1", and on the other hand, that the digital video signal corresponds to one field when the picture information quantity identification code is "0". The signal format of the video signal part differs according to whether the digital video signal is transmitted in terms of frames or fields. Accordingly, the reproducing apparatus detects the picture information quantity identification code, to carry out the write-in of the video signal in accordance with the signal format used.

A 1-bit picture transmission identification code represented by "A/$\overline{P}$", is located at the eleventh bit of the second word of the header signal. When this picture transmission identification code is "1", it is identified that the digital video signal which is to be transmitted relates to a still picture which should be displayed in full on the screen (so-called full-picture transmission). On the other hand, if the picture transmission identification code is "0", it is identified that the digital video signal which is to be transmitted relates to a picture which should be displayed on a part of the screen by the so-called partial rewriting of the digital video signal.

A 1-bit write-in specifying code represented by "B19W", is located at the twelfth bit of the second word of the header signal. A 1-bit read-out specifying code represented by "B19R", is located at the thirteenth bit in the second word of the header signal. These write-in and read-out specifying codes are provided with respect to two memories within the reproducing apparatus which will be described hereinafter in conjunction with FIG. 6. When the write-in and read-out specifying codes are both "0" (or "1"), the picture element data of the digital video signal are written into a first (or second) memory, and the stored picture element data are read out and displayed on the screen. This means that the content of the picture is changed while displaying the picture, and as a result, it is possible to display a moving picture at a part of the still picture which is being displayed. On the other hand, when the write-in specifying code is "0" and the read-out specifying code is "1", the picture element data read out from a second memory are displayed while the picture element data are written into the first memory. In this case, the display on the screen is changed to the display of the picture element data read out from the first memory from the display of the picture element data read out from the second memory, according to an end-of-data signal, after the write-in with respect to the first memory is completed. The end-of-data signal is a one-word signal which is added to the terminal part of the digital video signal. Further, when the write-in specifying code is "1" and the read-out specifying code is "0", the picture element data read out from the first memory are displayed while the picture element data are written into the second memory.

Three 1-bit memory identification codes represented by "B2" through "B0", are located in the fourteenth through sixteenth bits of the second word. Six columns of memory element groups 71-1 through 71-6 are in memories 54 and 55 within the reproducing apparatus which will be described hereinafter in conjunction with FIGS. 5 and 6. The three memory identification codes identify which column of memory element groups is to store the picture element data groups transmitted immediately subsequent to the header signal. For example, if the three memory identification codes are "000", the picture element data groups are stored in the first column of memory element groups. Similarly, the picture element data groups are stored in the second, third, fourth, fifth, and sixth rows of memory element groups when the three memory identification codes are "100", "010", "110", "001", and "101".

The picture element data groups of the digital luminance signal are stored in the first through fourth columns of memory element groups. The picture element data groups of the first digital color difference signal are stored in the fifth column of memory element groups, and the picture element data of the second digital color difference signal are stored in the sixth column of memory element groups.

A third word of the header signal consists of upper 8 bits 30a and lower 8 bits 30b. The upper 8 bits 30a comprises bits B3 through B10, and the lower 8 bits 30b comprises bits B3 through B10. A fourth word of the header signal consists of upper 8 bits 31a and lower 8 bits 31b. The upper 8 bits 31a comprises bits B11 through B18, and the lower 8 bits 31b comprises bits B11 through B18. These third and fourth words of the header signal are 16-bit address codes, and indicate an address in the memory circuit for storing the first picture element data corresponding to the upper 8 bits of the first word in the video signal part which is transmitted subsequent to the header signal. The bits B3 through B10 indicate the lower byte of the address code, and the bits Bll through B18 indicate the upper byte of the address code.

The television signals used throughout the world either have 625 scanning lines or 525 scanning lines. And, although the digital video signal is a time-sequentially multiplexed signal of picture element data of 572 scanning lines which actually include the picture information, the digital video signal is transmitted under the 625-line system. Accordingly, if reproduction is to be carried out under the 525-line system, the number of scanning lines must be converted in the reproducing apparatus before storing the picture element data into the memory circuit. Thus, the address signal for this memory circuit must assume two different addresses with respect to the 625-line system and the 525-line system. Hence, the bits "B3" through "B18" in the upper 8 bits 30a and 31a, indicate the address of picture element data in the upper 8 bits of the first word of the video signal part in the 625-line system. On the other hand, the bits "B3" through "B18" in the lower 8 bits 30b and 31b, indicate the address of the picture element data in the upper 8 bits of the first word of the video signal part in the 525-line system obtained by the conversion of the number of scanning lines.

A fifth word 32 and a sixth word 33 of the header signal, are spare words. Normally, these words 32 and 33 are all "0". Because it is known beforehand that these two words are all "0", these two words are not detected in the reproducing apparatus. The reproducing apparatus then goes on to detect the next picture element data group.

Figure 4:
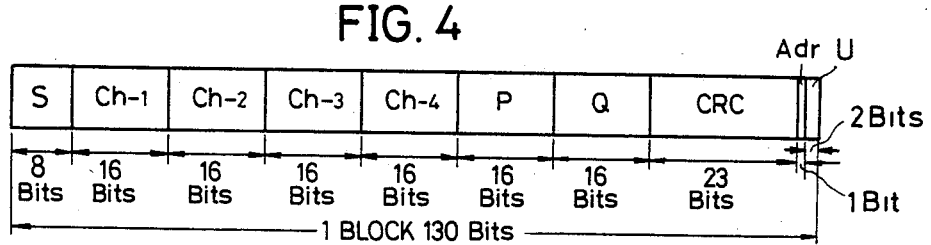
FIG. 4 shows an example of a signal format of a digital signal when recording the digital video signal shown in FIG. 1 onto a recording medium together with another signal.

The digital video signal having the signal format shown in FIG. 1, is arranged within one block signal shown in FIG. 4 in terms of one or two words, from the left to the right in FIG. 1. The digital video signal is recorded onto the recording medium in terms of this one block. In FIG. 4, one block is made up of 130 bits. A synchronizing signal S having an 8-bit fixed pattern is at the beginning of one block. Positions where each one word of the 4-channel digital data is arranged, are represented by Ch-1 through Ch-4. The digital video signal is transmitted by arranging one word of the digital video signal at the position represented by Ch-4, for example. The digital video signal may be transmitted by arranging two words, that is, one word in each of the two positions represented by Ch-3 and Ch-4. The positions Ch-1 through Ch-3, or in the latter case, the positions Ch-1 and Ch-2, which are not occupied by the digital video signal, are used to transmit the digital audio signal. One word of the digital audio signal which is sampled at the sampling frequency 44.1 kHz and quantized, and is made up of 16 bits, is arranged within the positions Ch-1 through Ch-3, or in the latter case, the positions Ch-1 and Ch-2.

Positions where two kinds of 16-bit error code correction signals are arranged, are represented by P and Q. These error code correction signals are used upon reproduction to correct code errors in the digital data which are arranged within the positions Ch-1 through Ch-4 and transmitted. A position where a 23-bit error code detection signal is arranged, is represented by CRC. This error code detection signal is used upon reproduction to detect existence of a data error within the block. Further, a position where one bit of a 196-bit signal which is used for random access and the like is arranged, is represented by Adr. All of the 196 bits in this 196-bit signal is thus transmitted by 196 blocks.

A position where a so-called 2-bit user's bits are arranged, is represented by U. The user's bits are spare bits. Therefore, the signal of one block shown in FIG. 4 is made up of a total of 130 bits including the synchronizing signal S through the user's bits U, and the digital signal is time-sequentially transmitted in terms of such blocks at the same frequency as the sampling frequency of 44.1 kHz of the digital audio signal, for example. The transmitted digital signal is passed through a modulator and a recording apparatus which uses a laser beam, and finally recorded on the disc. Thus, if the rotational speed of the disc is 900 rpm, 2940 blocks are recorded or reproduced in one revolution of the disc. This means that the 196-bit signal is recorded or reproduced fifteen times in one revolution of the disc.

Figure 5:
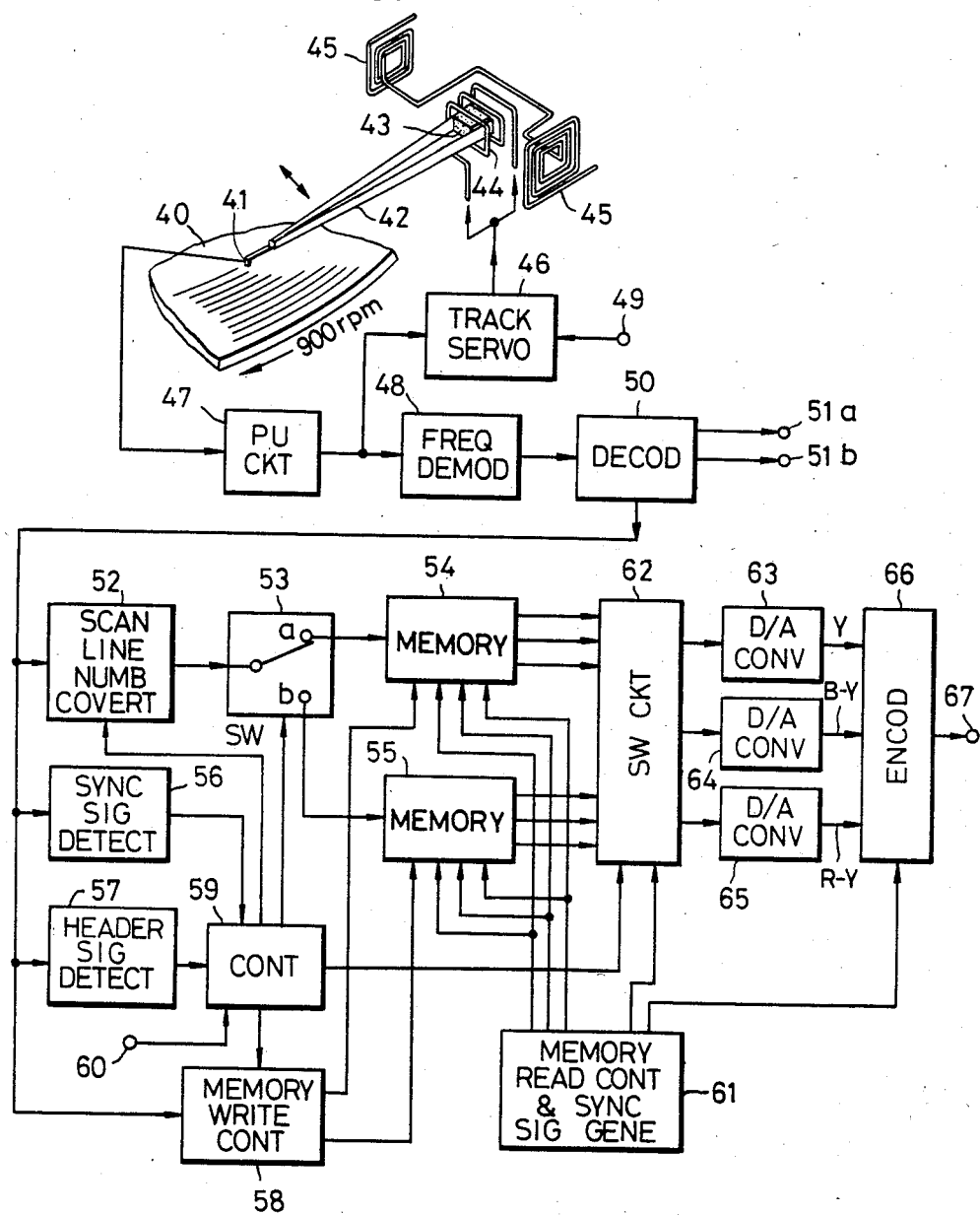
FIG. 5 is a systematic block diagram showing an example of a reproducing apparatus having an address signal generating circuit according to the present invention.

In the above modulator, the digital signal having the signal format shown in FIG. 4 is subjected to modified frequency modulation (MFM) or randomized by use of a maximum length sequence and carrying out a modulo-2 addition, for example, and thereafter formed into a frequency modulated signal by frequency-modulating a carrier of 7 MHz, for example. In addition, the recording apparatus forms a first modulated light beam which is obtained by modulating the frequency modulated signal from the modulator, and a second modulated light beam which is modulated by a first tracking control signal fpl or a second tracking control signal fp2. The first and second modulated light beams are focused on a photosensitive layer which is formed on a disc. A stamper disc is formed by carrying out known developing and disc manufacturing processes. A disc 40 shown in FIG. 5 is duplicated from this stamper disc.

The disc 40 is recorded with the frequency-modulated signal of the signal which is obtained by time-sequentially multiplexing the digital audio signals and the digital video signals in terms of blocks where one block has the signal format shown in FIG. 4. This frequency-modulated signal is recorded on a spiral main track on the disc 40 as rows of intermittent pits. The first and second tracking control signals fpl and fp2 of a constant frequency within a band lower than the band of the above frequency-modulated signal, are alternately recorded as rows of intermittent pits on subtracks at substantially intermediate parts between centerlines of mutually adjacent main tracks for each track turn of the disc 40. Further, a third tracking control signal fp3 is recorded on the main track at parts where the sides on which the first and second tracking control signals fpl and fp2 are recorded change over. Tracking grooves for guiding a reproducing stylus are not formed on the disc 40, and the disc 40 has an electrode function.

The disc 40 is placed onto a turntable (not shown) and rotated at a rotational speed of 900 rpm. A bottom of a reproducing stylus 41 slides over the surface of the rotating disc 40. The reproducing stylus 41 is fixed to one end of a cantilever 42, and a permanent magnet 43 is fixed to the other base end of the cantilever 42. The part of the cantilever 42 where the permanent magnet 43 is fixed, is encircled by a tracking coil 44 and a jitter compensation coil 45 fixed to the reproducing apparatus. The tracking coil 43 generates a magnetic field along a direction perpendicular with respect to the magnetic direction of the permanent magnet 43. Accordingly, the cantilever 42 is moved along one of the directions in the width direction of the track according to the polarity of a tracking error signal from a tracking servo circuit 46 with a displacing quantity according to the magnitude of the tracking error signal.

A high-frequency reproduced signal is obtained from a pickup circuit 47. This pickup circuit 47 comprises a resonance circuit which is varied of its resonance frequency in response to the variations in electrostatic capacitance formed between an electrode fixed to a rear surface of the reproducing stylus 40 by deposition and the disc 40 according to the rows of intermittent pits, a circuit for applying a signal of a constant frequency to this resonance circuit, a circuit for amplitude-detecting a high-frequency signal from the resonance circuit varying in its amplitude according to the above variations in the electrostatic capacitance, and a circuit for preamplifying the amplitude-detected high-frequency signal (reproduced signal). The high-frequency signal obtained from the pickup circuit 46 is supplied to a frequency demodulating circuit 48 wherein the main information signal (the digital audio signals and the time-sequentially multiplexed digital video signal in this case) from the main track is demodulated on one hand, and a part thereof is separated and supplied to the tracking servo circuit 46.

The tracking servo circuit 46 frequency-selects and obtains the first through third tracking control signals fp1 through fp3 from the reproduced signal. Envelopes of the first and second tracking control signals fp1 and fp2 thus obtained are detected and passed through a differential amplifier (not shown) to obtain the tracking error signal, and this tracking error signal is supplied to the tracking coil 44. Here, it must be noted that the positional relationships between the first and second tracking control signals fp1 and fp2 with respect to the main track, changes for each track turn of the disc 40. Accordingly, the tracking polarity is reversed for each track turn of the disc 40, by a switching pulse produced according to the detection or reproduction of the third tracking control signal fp3. The tracking servo circuit 46 drives the tracking coil 44 so that the reproducing stylus 41 is forcibly kicked and shifted by one or more than track pitch along the track width direction according to a kick instruction signal, when the kick instruction signal is applied to an input terminal 49.

On the other hand, the demodulated digital signal obtained from the frequency demodulator 48 is applied to a decoder 50 wherein the demodulated digital signal is subjected to MFM demodulation and formed into the time-sequentially multiplexed signal having the signal format shown in FIG. 4. The beginning of the block of the time-sequentially multiplexed signal is detected according to the synchronizing signal bits S, and the series signal is converted into a parallel signal, and furthermore, the error is detected. The error code correction signals P and Q are used to correct the error and restore the signal only when an error is detected. Hence, by correcting the error and restoring the signal according to the needs, two channels of the 16-bit digital audio signals including no errors among the four channels of 16-bit digital signals restored to their original order with interleaving signal arrangement, are converted into analog audio signals by a digital-to-analog (D/A) converter within the decoder 50 and produced through output terminals 51a and 51b. In addition, the pickup control signal is supplied to a predetermined circuit (not shown) for carrying out high-speed search and the like.

For example, the digital video signal having the signal format shown in FIG. 1 and FIG. 2 which is time-sequentially reproduced from the third and fourth channels, is supplied to a converting circuit 52 for converting the number of scanning lines. The number of scanning lines is converted into 525 lines from 625 lines at the converting circuit 52.

The scanning line number converting circuit 52 is only needed in the reproducing apparatus where it is necessary to reproduce and produce an analog color video signal in accordance with the NTSC system which is a 525-line system, and there is no need for the scanning line number converting circuit 52 in reproducing apparatuses where it is only necessary to reproduce and produce an analog color video signal in accordance with the PAL system or the SECAM system which are 625-line systems. However, a switch for switching the input and output of the scanning line number converting circuit 52 may be provided in some reproducing apparatuses. In such reproducing apparatuses, the switch can be switched to make the scanning line number converting circuit 52 operative or inoperative according to the number of scanning lines of the television system. The output picture element data of the scanning line number converting circuit 52 is supplied to a memory circuit 54 or 55 through a switching circuit 53.

The digital video signal successively obtained time-sequentially from the decoder 50 with the signal format shown in FIG. 1, is supplied to a synchronizing signal detecting circuit 56, a header signal detecting circuit 57, and a memory write controller 58. The synchronizing signal detecting circuit 56 detects the synchronizing signal within the header signal, and supplies a detection signal to a control circuit 59. The header signal detecting circuit 57 discriminates each of the codes and address signal within the header signal, and supplies a resulting output to the control circuit 59.

The control circuit 59 is supplied with signals such as a synchronizing signal detection signal from the synchronizing signal detecting circuit 58, detection signals of each of the codes within the header signal obtained from the header signal detecting circuit 57, and a signal (category number signal) specifying the desired category (various kinds of special picture identified by the picture category identification code "P.G") selected by the user of the reproducing apparatus and applied to an input terminal 60 by manipulating an external switch and the like. The control circuit 59 discriminates each of the signals supplied thereto, and controls the scanning line number converting circuit 52, the switching circuit 53, the memory write controller 58, a switching circuit 62, and the like.

The memory write controller 58 carries out control so that the picture element data within the digital video signal which is supplied to the memory circuit 54 or 55, is written into a predetermined address according to the address signal within the header signal. However, the memory write controller 58 carries out control so that the header signal is not written in the field memory. The switching circuit 53 is switched over to connect to a contact a or b by the control signal from the control circuit 59, in accordance with the write-in specifying code within the header signal. Thus, the digital video signal is supplied to the memory circuit 54 or 55 which is specified by the write-in specifying code.

The memory circuits 54 and 55 simultaneously read out the reproduced picture element data which are written in according to a read-out control signal from a memory read controller and synchronizing signal generator 61, and also compensate for the jitter introduced upon reproduction. The digital luminance signals read out from the memory circuits 54 and 55 are read out with a sampling frequency of 9 MHz and a quantization number of 8 bits with respect to one picture, and the first and second digital color difference signals read out from the memory circuits 54 and 55 are read out with a sampling frequency of 2.25 MHz and a quantization number of 8 bits with respect to one picture. The digital luminance signal and the first and second digital color difference signals thus read out from the memory circuits 54 and 55, are supplied to the switching circuit 62.

The switching circuit 62 selectively produces the data according to the read-out specifying code within the header signal. The picture element data of the digital luminance signal is thus supplied to a digital-to-analog (D/A) converter 63, and the picture element data of the two kinds of digital color difference signals are respectively supplied to D/A converters 64 and 65.

The analog luminance signal obtained from the D/A converter 63, the color difference signals (R−Y) and (B−Y) obtained from the D/A converters 64 and 65, the horizontal and vertical synchronizing signals and the color burst signal respectively obtained from the memory read controller and the synchronizing signal generating circuit 61, are respectively supplied to an encoder 66 which produces a color video signal which is in conformance with the NTSC system. The color video signal which is in conformance with the NTSC system, is supplied to a monitoring color television receiver (not shown) through an output terminal 67. The color still picture, partially moving picture, and the like which is displayed on the television receiver, acts as a supplementary information for the listener to enjoy, with respect to the reproduced sound which is obtained by reproducing the audio signals produced through the output terminals 51a and 51b.

Figure 6:
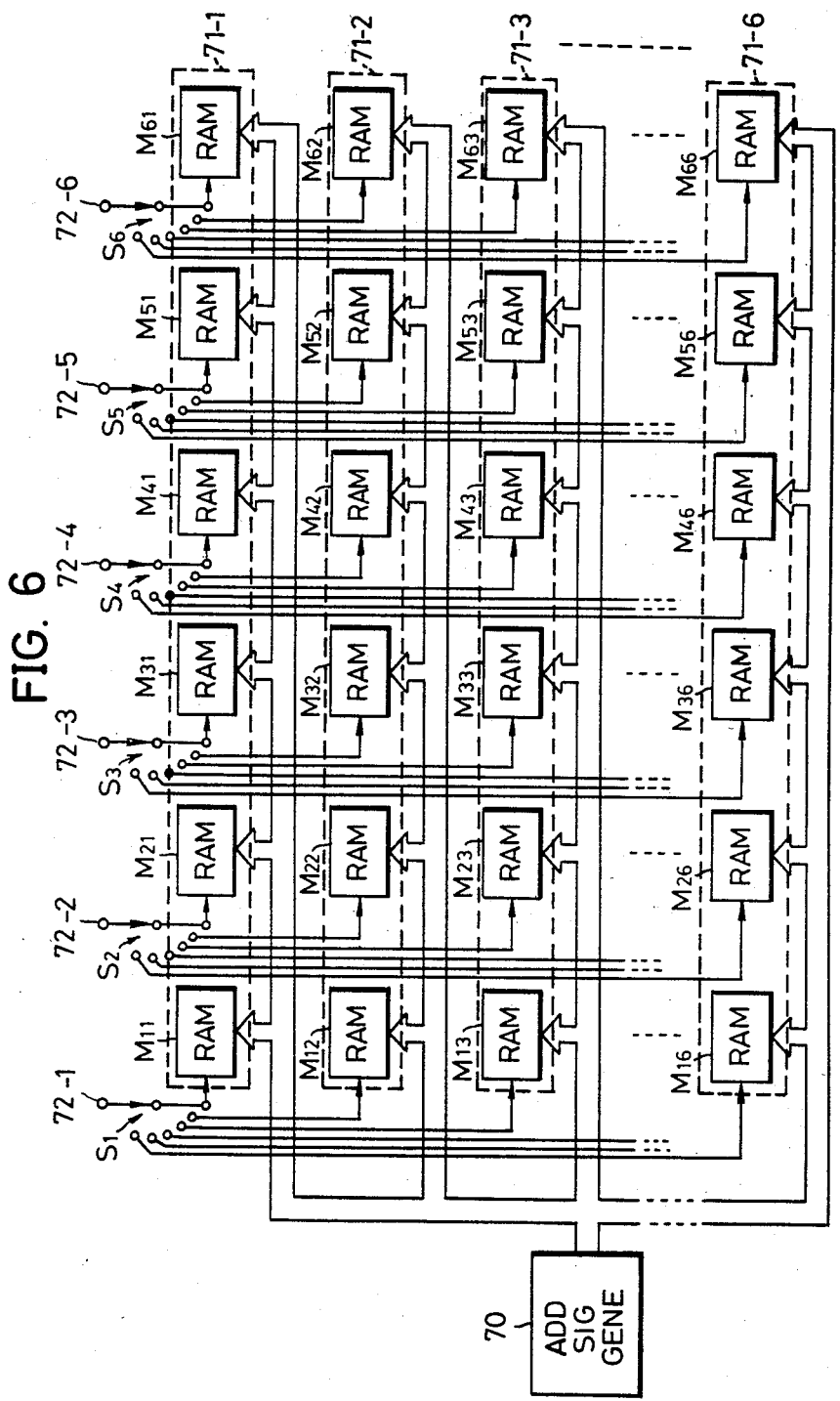
FIG. 6 is a systematic block diagram showing an example of a memory circuit and an address signal generating circuit within the block system shown in FIG. 5.

Next, description will be given with respect to the construction of the memory circuits 54 and 55 in the reproducing apparatus shown in FIG. 5. FIG. 6 shows the construction of one of the memory circuits 54 and 55 which has a memory capacity corresponding to one frame, together with an address signal generating circuit 70 within the memory write controller 58. Blocks $M_{11}, M_{21}, M_{31}, \ldots, M_{61}, M_{12}, M_{22}, \ldots, M_{62}, M_{13}, M_{23}, \ldots, M_{63}, M_{16}, \ldots$, and $M_{66}$ each represents a 64k RAM (random access memory of 64k bits). A total of thirty six 64k RAMs are each supplied with an address signal from the common address signal generator 70. The total memory capacity of the thirty six 64k RAMs is slightly larger than the memory capacity which corresponds to one frame. Thus, if the memory circuits 54 and 55 respectively are field memories, the construction shown in FIG. 6 corresponds to the whole memory circuit comprising both the memory circuits 54 and 55.

The memory circuit 54 or 55 comprises a first column of memory element group 71-1 which consists of the six RAMs $M_{11}, M_{21}, \ldots$, and $M_{61}$, a second column of memory element group 71-2 which consists of the six RAMs $M_{12}, M_{22}, \ldots$, and $M_{62}$, and third through sixth columns of memory element groups 71-3 through 71-6 each similarly consisting of six RAMs. Each bit of the picture element data, is supplied to each of the six RAMs in each of the six columns of memory element groups 71-1 through 71-6, through input terminals 72-1 through 72-6 and switches $S_1$ through $S_6$ which have six contacts. Actually, the switches $S_1$ through $S_6$ are analog switches which operate electrically. The upper six bits of the 8-bit picture element data are supplied to the input terminals 72-1 through 72-6 in parallel. The switch $S_1$ supplies the MSB of the picture element data to one of the RAMs $M_{11}, M_{12}, \ldots, M_{16}$. Similarly, a switch $S_i$ (i is an integer from 2 to 6) supplies the i-th bit of the picture element data counted from the MSB (MSB is considered as the first bit) to one of the RAMs $M_{ij}$ (j is an integer from 1 to 6). Accordingly, in the memory circuit shown in FIG. 6, the lower 2 bits among the 8 bits of picture element data are discarded, however, there is substantially no effect on the reproduced picture by such discarding of the lower 2 bits of the picture element data. It is of course possible to add twelve more 64k RAMs to the memory circuit shown in FIG. 6, to store all the 8 bits of the picture element data. However, in the digital video signal reproducing apparatus for home use, it will be more advantageous to use the memory circuit having the construction shown in FIG. 6 in order to keep the cost of the reproducing apparatus low.

Next, description will be given with respect to the operation of the memory circuit shown in FIG. 6. For convenience' sake, description will be given with respect to a reproducing apparatus in which the reproduced digital video signal is directly supplied to the memory circuits 54 and 55, and carries out reproduction to produce an analog color video signal in accordance with the PAL system or the SECAM system.

Among the 6 columns of memory element groups 71-1 through 71-6, the first through fourth columns of memory element groups 71-1 through 71-4 independently store the luminance picture element data groups. In addition, the fifth and sixth columns of memory element groups 71-5 and 71-6 independently store the picture element data of the two kinds of digital color difference signals.

As described before, the number of luminance picture elements in one frame is (114×4) elements in the horizontal direction and 572 elements in the vertical direction of the picture. Four mutually adjacent luminance picture element data which are to be displayed in the same scanning line, are independently stored in the memory element groups 71-1 through 71-4 at the same address. For this reason, with respect to one scanning line, the luminance picture element data are stored in the memory element groups 71-1 through 71-4 at a total of 114 addresses. On the other hand, the number of picture elements of each of the two kinds of digital color difference signals is 114 elements in the horizontal direction and 572 elements in the vertical direction of the picture, as described before. Each of the picture element data of the two kinds of digital color difference signals which are to be displayed in the same scanning line, are independently stored in the memory element groups 71-5 and 71-6. Accordingly, for one scanning line, the picture element data of the two kinds of digital color difference signals are stored in the memory element groups 71-5 and 71-6 at a total of 114 addresses. Each of the picture element data of the two kinds of digital color difference signals are stored at the same address as the four luminance picture element data which are displayed at the same position on the screen as these picture element data of the two kinds of digital color difference signals.

As described previously in conjunction with FIGS. 1 and 2, the reproduced component coded signal is transmitted so as to facilitate the conversion of the number of scanning lines. That is, the picture element data in the vertical direction of the picture are successively transmitted in a sequence such that the upper 8 bits of one word is transmitted first, the lower 8 bits of the same word is transmitted subsequently, the upper 8 bits of a subsequent word is transmitted thereafter, etc., and supplied to the memory circuit 54 or 55. The write-in address with respect to the memory circuit 54 or 55 for the picture element data in the lower 8 bits of each word, must have an address value which is larger than the write-in address of the picture element data in the upper 8 bits of the same word by "114", that is, by "0072" in hexadecimal. Similarly, the write-in address of the picture element data arranged in the upper 8 bits of an arbitrary word must have an address value which is larger than the write-in address of the picture element data in the lower 8 bits of a word which precedes this arbitrary word by "0072" in hexadecimal. When the write-in is carried out by setting the write-in addresses in this manner, the written picture element data can be read out from the memory circuit 54 or 55 in a sequence so that the picture element data are read out from the left to right of the picture and from the top to bottom of the picture, by incrementing the read-out address by "0001".

Accordingly, during the write-in operation, the address signal generating circuit 70 generates an address signal indicating the address value for the picture element data in the upper 8 bits of the first word which is in the picture element data group immediately after the header signal, according to the value of the address codes "B3" through "B18" shown in FIG. 3. Thereafter, every time the picture element data having the quantization number of 8 bits are supplied to the memory circuit 54 or 55, the address signal generating circuit 70 generates a 16-bit address signal indicating an address value which is incremented by "0072" in hexadecimal and supplies this address signal to the memory circuit 54 or 55.

Assuming that the header signal $H_{V1}$ shown in FIG. 1 is reproduced, the address signal generating circuit 70 generates a 16-bit address signal indicating a value "0000" in hexadecimal, and supplies this address signal to the memory circuit 54 or 55. On the other hand, each bit in the upper 6 bits of the picture element data which is arranged in the upper 8 bits of the first word in the picture element data group $Y_{V1}$ which is related to the digital luminance signal, is passed through the switches $S_1$ through $S_6$, respectively, and written at the address "0000" in the RAMs $M_{11}$ through $M_{61}$ which are in the memory element group 71-1.

Next, the address signal generating circuit 70 generates an address signal indicating a value "0072" in hexadecimal. However, the switches $S_1$ through $S_6$ are kept in their original connected states. Then, each bit in the upper 6 bits of the reproduced picture element data which is arranged in the lower 8 bits of the first word in the picture element data group $Y_{V1}$ which is related to the digital luminance signal, is passed through the switches $S_1$ throuh $S_6$, respectively, and written at the address "0072" in the RAMs $M_{11}$ through $M_{61}$ which are in the memory element group 71-1. Similarly thereafter, each bit in the upper 6 bits of the picture element data in the picture element data group $Y_{V1}$ is written at an address which is incremented by "0072" in the RAMs $M_{11}$ through $M_{61}$ which are in the memory element group 71-1. As a result, a total of 572 picture element data in the picture element data group $Y_{V1}$ are written in the memory element group 71-1.

The header signal $H_{V2}$ is reproduced subsequently, and the address signal generating circuit 70 again generates a 16-bit address signal indicating a value "0000" in hexadecimal. At the same time, the switches $S_1$ through $S_6$ are switched over so that each of the 1-bit data applied to the input terminals 72-1 through 72-6 are supplied to the RAMs $M_{12}$ through $M_{62}$ in the memory element group 71-2. Accordingly, each bit in the upper 6 bits of the reproduced picture element data which is arranged in the upper 8 bits of the first word in the picture element data group $Y_{V2}$ which is related to the digital luminance signal, is passed through the switches $S_1$ through $S_6$, respectively, and written at the address "0000" in the RAMs $M_{12}$ through $M_{62}$ which are in the memory element group 71-2. Then, the address signal generating circuit 70 generates an address signal indicating a value "0072" in hexadecimal, each bit in the upper 6 bits of the reproduced picture element data which is arranged in the lower 8 bits of the first word in the picture element data group $Y_{V2}$ which is related to the digital luminance signal, is written at the address "0072" in the RAMs $M_{12}$ through $M_{62}$ which are in the memory element group 71-2. Similarly thereafter, each bit in the upper 6 bits of the picture element data in the picture element data group $Y_{V2}$ is written at an address which is incremented by "0072" in the RAMs $M_{12}$ through $M_{62}$ which are in the memory element group 71-2.

In a similar manner, the picture element data in the picture element data groups $Y_{V3}$ and $Y_{V4}$ are respectively written in the memory element groups 71-3 and 71-4. In addition, the picture element data in the picture element data groups $(R-Y)_{V1}$ and $(B-Y)_{V1}$ are respectively written in the memory element groups 71-5 and 71-6. The addresses where the picture element data in the picture element data groups $Y_{V3}$, $Y_{V4}$, $(R-Y)_{V1}$, and $(B-Y)_{V1}$ are written, are incremented by "0072" and assume values "0000", "0072", "00E4", "0156", . . . . The picture element data in the picture element data group $Y_{V5}$ which are subsequently obtained, are written in the memory element group 71-1. However, the first write-in address which is generated by the address signal generating circuit 70 is "0001", because the header signal $H_{V7}$ is reproduced immediately before the picture element data group $Y_{V5}$. Thereafter, the address signal generating circuit 70 generates a write-in address which is incremented by "0072" in hexadecimal and assumes values "0073", "00E5", "0157", . . . . Further, the picture element data in the remaining picture element data groups $Y_{V6}$, $Y_{V7}$, $Y_{V8}$, $(R-Y)_{V2}$, and $(B-Y)_{V2}$ which make up the same unit as the picture element data group $Y_{V5}$, are respectively written at the addresses "0001", "0073", . . . in the memory element groups 71-2 through 71-6. The write-in operation described heretofore is repeated in a similar manner, and the picture element data in the picture element data groups $Y_{V453}$, $Y_{V454}$, $Y_{V456}$, $(R-Y)_{V114}$, and $(B-Y)_{V114}$ which make up the last unit, are respectively written at the addresses "0071", "00E3", "0155", . . . .

When producing from the reproduced signal an analog video signal which is in conformance with the NTSC system, the number of scanning lines of the digital video signal obtained from the decoder 50 is converted at the scanning line number converting circuit 52, before carrying out the write-in with respect to the memory circuit 54 or 55. In this case, the write-in operation with respect to the memory circuit is the same as the operation described heretofore, except that the number of data is reduced to 5/6 the number of data in the case described before due to the conversion of the number of scanning lines. Therefore, detailed description for this case will be omitted.

During a read-out operation carried out with respect to the memory circuit 54 and 55, a common read-out address which is generated from an address signal generating circuit within the memory read controller 61 and supplied to the memory element groups 71-1 through 71-6, is incremented by "0001". The written picture element data in the memory element groups 71-1 through 71-6 are read out in parallel. The speed with which the read-out is carried out with respect to the memory element groups 71-1 through 71-4, is different from the speed with which the read-out is carried out with respect to the memory element groups 71-5 and 71-6.

The present invention relates to an address signal generating circuit such as the address signal generating circuit 70 which generates an address signal indicating a value which is incremented by a predetermined value (in the case described heretofore, the increment is "0072"). Description will hereinafter be given with respect to an embodiment of an address signal generating circuit according to the present invention, by referring to FIG. 7.

Figure 7:
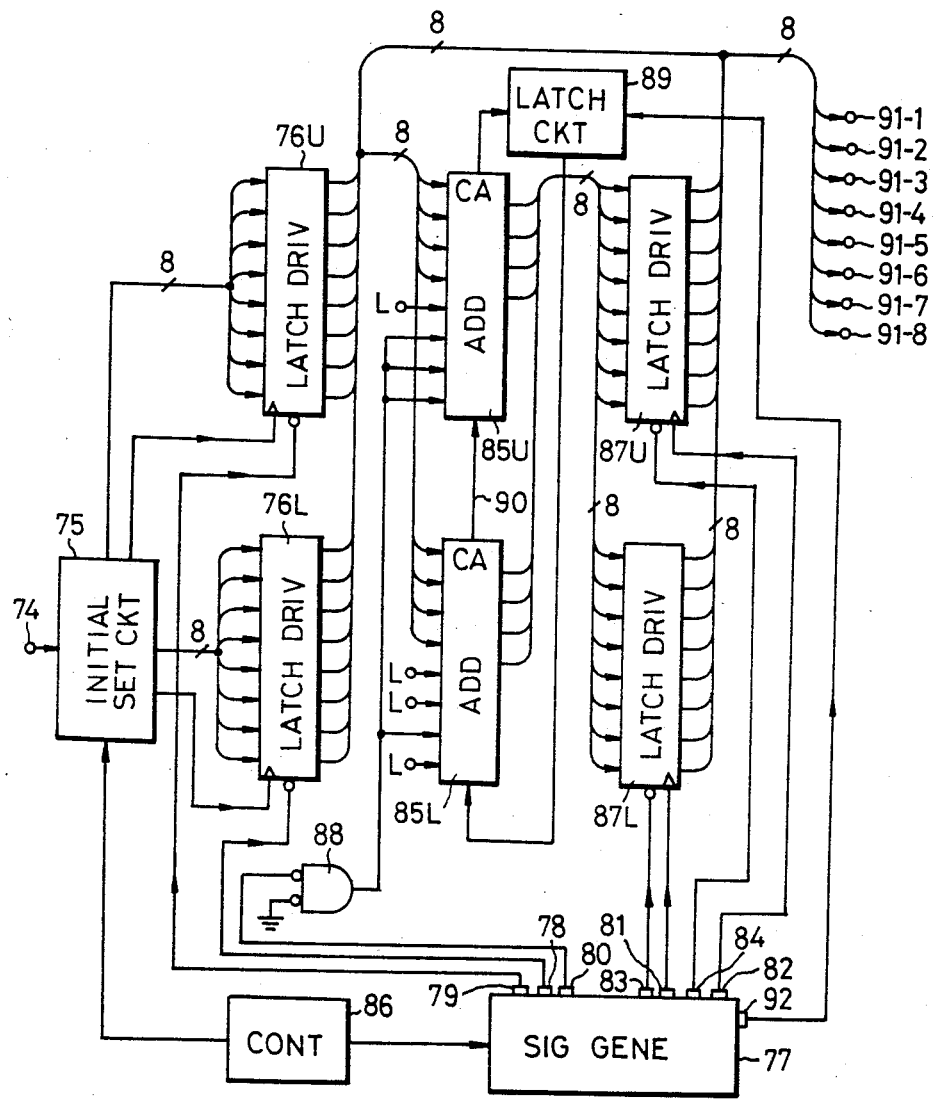
FIG. 7 is a systematic circuit diagram showing an embodiment of an address signal generating circuit according to the present invention.

FIG. 7 is a systematic circuit diagram showing an embodiment of an address signal generating circuit according to the present invention. A value obtained from the control circuit 59 shown in FIG. 5, which is in accordance with the address codes "B3" through "B10" in the header signal, is supplied to an initial value setting circuit 75 through an input terminal 74. The initial value setting circuit 75 generates a 16-bit address signal which indicates the address where the first picture element data in each of the divided picture element data groups is to be written. The first picture element data is the data which is arranged in the upper 8 bits of the first word in each of the 286-word divided picture element data groups. The upper 8 bits of the 16-bit address signal which is generated by the initial value setting circuit 75 are supplied to a latch driver 76U and latched therein, and the lower 8 bits of the same address signal are supplied to a latch driver 76L and latched therein. Thus, when reproducing the header signals $H_{V1}$ through $H_{V6}$, a value "00" in hexadecimal (the values given hereinafter are all hexadecimal values) is latched in the latch drivers 76U and 76L. A latch pulse is supplied from the initial value setting circuit 75 to the latch drivers 76U and 76L.

First, when starting the operation, a drive pulse is produced through an output terminal 78 of a signal generating circuit 77, and supplied to the latch driver 76L. Thus, an 8-bit signal in which all of the bits are "0" (value "00") is produced from the latch driver 76L. The upper 4 bits of the 8-bit signal produced by the latch driver 76L are supplied to an adder 85U, and the lower 4-bits of the same signal are supplied to an adder 85L, through an 8-bit transmission path. At the same time, the 8-bit output signal of the latch driver 76L is produced in parallel through output terminals 91-1 through 91-8, as an address signal which corresponds to the lower 8 bits of the 16-bit address signal. A controller 86 controls the signal generating circuit 77, so that each of the output signals of the signals of the signal generating circuit 77 and the output signal of the initial value setting circuit 75 are synchronized.

Next, a drive pulse is produced through an output terminal 79 of the signal generating circuit 77, and supplied to the latch driver 76U. Hence, the latch driver 76U produces a signal indicating the initial value "00", and the upper 4 bits of this signal are supplied to the adder 85U while the lower 4 bits of the signal are supplied to the adder 85L, through the 8-bit transmission path. At the same time, the 8-bit output signal of the latch driver 76U is produced in parallel through the output terminals 91-1 through 91-8, as an address signal which corresponds to the upper 8 bits of the 16-bit address signal. That is, the address signal is time-divisionally obtained through the output terminals 91-1 through 91-8 in a sequence with the lower 8 bits obtained first and the upper 8 bits obtained thereafter, and the initial value of the address signal is "0000". When a latch pulse is produced through an output terminal 81 of the signal generating circuit 77 and supplied to a latch driver 87L, a low-level signal is produced through an output terminal 80 and supplied to one input terminal of a gate circuit 88, in phase synchronism with the low-level signal which is produced through the output terminal 80. The other input terminal of the gate circuit 88 is grounded. Therefore, when the low-level signal is supplied to the above one input terminal of the gate circuit 88, the gate circuit 88 produces a high-level signal. This high-level output signal of the gate circuit 88 is applied to each of input terminals corresponding to the lower 3 bits in the adder 85U, and also to an input terminal corresponding to the seventh bit in the adder 85L. The adders 85U and 85L are both designed to add signals corresponding to the upper 4 bits and the lower 4 bits among the 8-bit input, and produce a 4-bit output signal which corresponds to the added result. The 4-bit output signal of the adder 85U is supplied to input terminals corresponding to the upper 4 bits in a latch driver 87U and to input terminals corresponding to the upper 4 bits in the latch driver 87L. On the other hand, the 4-bit output signal of the adder 85L is supplied to input terminals corresponding to the lower 4 bits in the latch driver 87U and to input terminals corresponding to the lower 4 bits in the latch driver 87L.

Further, among the 8-bit output signals of the latch drivers 76U, 76L, 87U, and 87L, the upper 4 bits of one of the signals are selectively applied to input terminals corresponding to the upper 4 bits in the adder 85U. Moreover, among the 8-bit output signals of the latch drivers 76U, 76L, 87U, and 87L, the lower 4 bits of one of the signal are selectively applied to input terminals corresponding to the lower 4 bits in the adder 85L.

In addition, a carry output signal of the adder 85U is latched by a latch circuit 89, and this carry output signal is supplied to the adder 85L. Moreover, a low-level signal is constantly applied to an input terminal corresponding to the fifth bit in the adder 85U, and input terminals corresponding to the fifth, sixth, and eighth bits in the adder 85L. Further, a carry output signal of the adder 85L is passed through a transmission path 90, and is then supplied to the adder 85U wherein this carry output signal is added with another input terminal.

Accordingly, during the period in which a low-level signal is obtained through the output terminal 80 of the signal generating circuit 77, the gate circuit 88 produces a high-level signal. For this reason, the adder 85U adds the value "7" of the lower 4 bits to the value (initial value is "0") of the upper 4 bits, and produces a 4-bit output signal. The adder 85U also adds the value of the carry signal when the carry signal is supplied to this adder 85U through the transmission path 90. The adder 85L adds the value "2" of the lower 4 bits to the value (initial value is "0") of the upper 4 bits, and produces a 4-bit output signal. When the carry output signal of the latch circuit 89 is supplied to this adder 85L, this adder 85L also adds the carry output signal. On the other hand, during the period in which a high-level signal is obtained through the output terminal 80, the gate circuit 88 produces a low-level signal. Thus, the values in the lower 4 bits of the adders 85U and 85L both become equal to "0".

When the lower 8 bits of the initial value "0000" are produced by the latch driver 76L, a low-level control signal is produced through the output terminal 80 and is supplied to the gate circuit 88. As a result, a signal from the adder 85U indicating a value "7" is supplied to input terminals corresponding to the upper 4 bits in both the latch drivers 87L and 87U, through the 8-bit transmission path. A signal from the adder 85L indicating a value "2" is supplied to input terminals corresponding to the lower 4 bits in both the latch drivers 87L and 87U, through the 8-bit transmission path. In this state, because the latch pulse from the output terminal 81 is only supplied to the latch driver 87L, a signal indicating a value "72" is latched by the latch driver 87L.

Next, at the same time as when the level of the output signal obtained through the output terminal 80 of the signal generating circuit 77 is switched over to high level, a drive pulse which is obtained through the output terminal 79 is supplied to the latch driver 76U. Accordingly, the upper 8 bits of the initial value "0000" are produced by the latch driver 76U and are obtained through the output terminals 91-1 through 91-8. Among the 8 bit signal indicating the value "00", the upper 4 bits indicating the value "0" are supplied to the adder 85U while the lower 4 bits indicating the value "0" are supplied to the adder 85L. Because the output signal obtained through the output terminal 80 assumes high level in this state, the output signal of the gate circuit 88 assumes low level. Thus, a signal indicating a value "0" is supplied to the input terminals corresponding to the lower 4 bits in both the adders 85U and 85L. Hence, a 4-bit signal indicating the value "0" is produced from both the adders 85U and 85L, and the 4-bit output signal of the adder 85U is supplied to the input terminals corresponding to the upper 4 bits in both the latch drivers 87U and 87L. The 4-bit output signal of the adder 85L is supplied to the input terminals corresponding to the lower 4 bits in both the latch drivers 87U and 87L.

Thereafter, a latch pulse is produced through an output terminal 82 of the signal generating circuit 77, and is supplied to the latch driver 87U. Thus, the latch driver 87U latches the above value "00" (this value becomes the value of the upper byte of the second address "0072"). In addition, a drive pulse is produced through an output terminal 83, and is supplied to the latch driver 87L. At the same time, a low-level signal is produced through the output terminal 80. As a result, the 8-bit signal indicating the value "72" which has been latched by the latch driver 87L up to that point in time, is produced through the output terminals 91-1 through 91-8 as a signal corresponding to the lower byte of the second address. Furthermore, at the same time, the 4-bit signal indicating the value "7" in the latch driver 87L is applied to the input terminals corresponding to the upper 4 bits in the adder 85U, and the 4-bit signal indicating the value "2" in the latch driver 87L is applied to the input terminals corresponding to the lower 4 bits in the adder 85L. Because of the low-level signal which is produced through the output terminal 80, the gate circuit 88 again produces a high-level signal. This high-level output signal of the gate circuit 88 is applied to the input terminals corresponding to the lower 3 bits in the adder 85U and to the input terminal corresponding to the seventh bit in the adder 85L. Accordingly, as a result of adding the values "7" and "7", the adder 85U produces a signal indicating a value "E". On the other hand, as a result of adding the values "2" and "2", the adder 85L produces a signal indicating a value "4". The signal indicating the value "E" which is obtained from the adder 85U and the signal indicating the value "4" which is obtained from the adder 85L, are latched in the latch driver 87L by a latch pulse which is subsequently generated through the output terminal 81.

Next, a drive pulse is produced through an output terminal 84 of the signal generating circuit 77, and is supplied to the latch driver 87U. At the same time, a high-level signal is again produced through the output terminal 80. Accordingly, the 8-bit signal indicating the value "00" which has been latched in the latch driver 87 up to that point in time, is produced through the output terminals 91-1 through 91-8 as a signal corresponding to the upper byte of the address signal. Therefore, the second address indicated by the address signal becomes equal to "0072". In addition, at the same time, the input signals which are applied to the input terminals corresponding to the lower 4 bits in both the adders 85U and 85L respectively assume low level. Hence, the adder 85U adds the signal indicating the value "0" which is received from the upper 4 bits in the latch driver 87U and supplied to the input terminals corresponding to the upper 4 bits in the adder 85U, and the signal indicating the value "0" which is supplied to the input terminals corresponding to the lower 4 bits in the adder 85U, and produces a signal indicating a value "0". On the other hand, the adder 85L adds the signal indicating the value "0" which is received from the lower 4 bits in the latch driver 87U and supplied to the input terminals corresponding to the upper 4 bits in the adder 85L, and the signal indicating the value "0" which is supplied to the input terminals corresponding to the lower 4 bits in the adder 85L, and produces a signal indicating a value "0". These output signals of the adders 85U and 85L are latched in the latch driver 87U when a latch pulse is subsequently produced through the output terminal 82.

Next, a drive pulse is produced through the output terminal 83, and the signal which is produced through the output terminal 80 again assumes low level. Thus, an 8-bit signal indicating a value "E4" is produced by the latch driver 87L, and is obtained through the output terminals 91-1 through 91-8 as a signal corresponding to the lower byte of the third address. Further, the adder 85U adds the signal indicating the value "E" which is received from the upper 4 bits in the latch driver 87L and supplied to the input terminals corresponding to the upper 4 bits in the adder 85U, and the signal indicating the value "7" which is received from the gate circuit 88 and the like and is supplied to the input terminals corresponding to the lower 4 bits in the adder 85U. The adder 85U thus produces a 4-bit signal indicating a value "5". In addition, a carry output signal is produced through a carry output terminal of the adder 85U, and is latched in the latch circuit 89. On the other hand, the adder 85L adds the signal indicating the value "4" which is received from the lower 4 bits in the latch driver 87L and supplied to the input terminals corresponding to the upper 4 bits in the adder 85L, and the signal indicating the value "2" which is received from the gate circuit 88 and the like and is supplied to the input terminals corresponding to the lower 4 bits in the adder 85L. The adder 85L thus produces a signal indicating a value "6". These output signals of the adders 85U and 85L are latched in the latch driver 87L when a latch pulse is subsequently produced through the output terminal 81.

Next, a drive pulse is produced through the output terminal 84, and the signal which is produced through the output terminal 80 again assumes high level. Thus, an 8-bit signal indicating a value "00" is produced by the latch driver 87U, and is obtained through the output terminals 91-1 through 91-8 as a signal corresponding to the upper byte of the third address. Thus, the third address becomes equal to "00E4". Further, the adder 85U adds the signal indicating the value "0" which is received from the upper 4 bits in the latch driver 87U and supplied to the input terminals corresponding to the upper 4 bits in the adder 85U, and the signal indicating the value "0" which is supplied to the input terminals corresponding to the lower 4 bits in the adder 85U. The adder 85U hence produces a 4-bit signal indicating a value "0". On the other hand, the adder 85L adds the signal indicating the value "0" which is received from the lower 4 bits in the latch driver 87U and supplied to the input terminals corresponding to the upper 4 bits in the adder 85L, the signal indicating the value "0" which is supplied to the input terminals corresponding to the lower 4 bits in the adder 85L, and a signal received from the latch circuit 89. The adder 85L hence produces a signal indicating a value "1". These output signals of the adders 85U and 85L are latched in the latch driver 87U, when a latch pulse is subsequently produced through the output terminal 82 of the signal generating circuit 77 and is supplied only to the latch driver 87U. Accordingly, the latch driver 87U produces the signal indicating the value "00" which corresponds to the upper byte of the third address, and thereafter, this latch driver 87U latches the signal indicating the value "01" which will correspond to the upper byte of the fourth address.

Next, a drive pulse is produced through the output terminal 83 of the signal generating circuit 77 and is supplied to the latch driver 87L. Hence, an 8-bit signal indicating a value "56" is produced through the output terminals 91-1 through 91-8 signal corresponding the lower byte of the fourth address. At the same time, a clear pulse is produced through an output terminal 92 and is supplied to the latch circuit 89, and in addition, the level of the output signal which is obtained through the output terminal 80 is again switched over to low level. As a result, as may be easily understood from the description given heretofore, the adder 85U adds the values "5" and "7" and produces a signal indicating a value "C". On the other hand, the adder 85L adds the values "6" and "2" and produces a signal indicating a value "8". Accordingly, an 8-bit signal indicating a value "C8" which will be the value in the lower byte of the fifth address, is latched in the latch driver 87L. After the latch driver 87U is driven and the signal indicating the value "01" which corresponds to the upper byte of the fourth address is produced, the signal indicating the value "01" is latched as the signal corresponding to the upper byte of the fifth address.

Operations similar to those described heretofore are repeated. As a result, an address signal indicating a value which is incremented by "0072" is produced through the output terminals 91-1 through 91-8, in the sequence in which the lower 8 bits of the address signal is produced first and the upper 8 bits of the address signal is produced subsequently.

The set value in the initial value setting circuit 75 is changed appropriately according to the signal obtained through the input terminal 74. For example, the set value is "0001" when the header signals $H_{V7}$ through $H_{V12}$ are reproduced, and is "0002" when the header signals $H_{V13}$ through $H_{V18}$ are reproduced. Further, when setting the initial value, the latch drivers 87U and 87L, the latch circuit 89, and the like are all reset to "0".

According to the address signal generating circuit shown in FIG. 7, it is possible to produce an address signal indicating a value which is successively incremented by "0072" from the set value. In addition, the 16-bit address signal which indicates a single value, is divided into the upper 8 bits and the lower 8 bits and produced time-divisionally.

The application of the address signal generating circuit according to the present invention is not limited to the above described case where the circuit is used for a memory circuit within an audio disc reproducing apparatus which was previously proposed in the U.S. application described before of which assignee is the same as the assignee of the present application, where the memory circuit was designed for storing digital video signals. For example, the address signal generating circuit according to the present invention may be used in a variety of applications where the circuit is to produce a write-in address signal or a read-out address signal indicating an address which is successively incremented by a predetermined value.

Further, the present invention is not limited to these embodiments, but various variations and modifications may be made without departing from the scope of the present invention.

What is claimed is:

1. An address signal generating circuit for a memory circuit, digital data being successively written in or read out from an address in said memory circuit, said address being successively incremented by a predetermined value, said address signal generating circuit comprising:
   a first latch driver for producing an m-bit signal corresponding to an upper m bits of a 2m-bit address signal which is to be generated, where m is an integer;
   a second latch driver for producing an m-bit signal corresponding to a lower m bits in said address signal;
   gate means for generating a specific signal which determines values of upper m bits and lower bits of a 2m-bit signal which has said predetermined value;
   a first adder for adding at least a value of upper n bits of the signal which has the predetermined value and a value of upper n bits of an output signal of said first or second latch driver, and for producing an n-bit signal which corresponds to upper n bits of a common input signal of said first ans second latch drivers, where n is an integer less than m;
   a second adder for adding at least a value of lower m-n bits of the signal which has the predetermined value and lower m-n bits of the output signal of said first or second latch driver, and for producing a (m-n)-bit signal which corresponds to lower m-n bits of the common input signal of said first and second latch drivers;
   latch means for supplying a carry signal of said first adder to said second adder so as to add the carry signal with the values supplied to said second adder, a carry signal of said second adder being supplied to said first adder so as to add the carry signal of said second adder with the values supplied to said first adder;

an initial value setting circuit for setting an initial value of said address signal and for producing a 2m-bit signal which has said initial value;

a third latch driver for latching a signal which corresponds to upper m bits of the 2m-bit signal which has said initial value, said third latch driver producing a latched signal thereof through output terminals and supplying the latched signal thereof to said first adder;

a fourth latch driver for latching a signal which corresponds to lower m bits of the 2m-bit signal which has said initial value, said fourth latch driver producing a latched signal thereof through the output terminals and supplying the latched signal thereof to said second adder; and driver control means for generating control signals including control signals for controlling operations of said first through fourth latch drivers, said driver control means alternately operating said first and second latch drivers by the control signals so that said first and second latch drivers alternately and time-divisionally produce the upper m bits ot the 2m-bit address signal and the lower m bits of the 2m-bit address signal, said first latch driver latching output signals of said first and second adders which are obtained by supplying the output signal of said first latch driver to said first and second adders when said first latch driver is operated, said second latch driver latching output signals of said first and second adders which are obtained by supplying the output signal of said second latch driver to said first and second adders when said second latch driver is operated, said driver control means operating said third and fourth latch drivers by the control signal so that the output signals of said third and fourth latch drivers are produced through the output terminals time-divisionally, said gate means generating said specific signal responsive to one of the control signals generated from said driver control means.

2. An address signal generating circuit as claimed in claim 1 in which said driver control means generates a pulse which assumes one of two levels in phase synchronism with the control signals which alternately operate said first and second latch drivers, said gate means generating said specific signal depending on the level of said pulse.

3. An address signal generating circuit as claimed in claim 1 in which said latch means latches the carry signal of said first adder and supplies the latched carry signal to said second adder as a signal indicating a value "1", said latch means being cleared substantially at the same time as when said second latch driver is driven.

4. An address signal generating circuit as claimed in claim 1 in which said digital data comprise picture element data groups which are obtained by subjecting an analog video signal corresponding to one frame or one field to a digital pulse modulation, each of said picture element data groups being made up a plurality of picture element data which are transmitted time-sequentially in a left to right sequence starting from a picture element data in a scanning line located at an uppermost part of a screen to a picture element data in a scanning line located at a lowermost part of the picture.

5. An address signal generating circuit as claimed in claim 1 in which said initial value setting circuit sets an initial value which is specified by an address code within a header signal which is transmitted together with said digital data.

* * * * *